United States Patent [19]

Krall

[11] Patent Number: 4,569,651
[45] Date of Patent: Feb. 11, 1986

[54] BLOW MOLDING APPARATUS

[75] Inventor: Thomas J. Krall, Toledo, Ohio

[73] Assignee: Owens-Illinois, Inc., Toledo, Ohio

[21] Appl. No.: 594,072

[22] Filed: Mar. 28, 1984

[51] Int. Cl.⁴ .......................................... B29C 49/42
[52] U.S. Cl. .................... 425/532; 425/190; 425/539
[58] Field of Search .............. 425/532, 539, 540, 538, 425/190, 194, 327; 264/543, 540; 65/237, 238, 264

[56] References Cited

U.S. PATENT DOCUMENTS

| | | | |
|---|---|---|---|
| 2,952,034 | 9/1960 | Fortner | 425/540 |
| 3,390,430 | 7/1968 | Lynch et al. | 425/151 |
| 3,516,118 | 6/1970 | Gallay | 425/532 |
| 3,523,329 | 8/1970 | Gallay | 425/532 |
| 3,764,250 | 10/1973 | Waterloo | 425/528 |

FOREIGN PATENT DOCUMENTS 2026972 12/1971 Fed. Rep. of Germany ...... 425/532

Primary Examiner—Jay H. Woo
Assistant Examiner—Joye L. Woodard
Attorney, Agent, or Firm—Philip M. Rice

[57] ABSTRACT

A blow molding apparatus wherein a plurality of sets of molds are mounted on a wheel rotatable about a horizontal axis and each set of molds comprises mold sections that are movable radially inwardly toward and away from one another to define a blow molding cavity wherein the plastic material is extruded from an extruder having an extruder head downwardly between the open molds, comprising a base plate, a platen pivoted on the base plate for movement about a vertical axis, such that an extruder mounted on the platen and having an extrusion head can be adjusted radially of the wheel to align the extruded plastic material with the plane of juncture of the mold sections.

6 Claims, 7 Drawing Figures

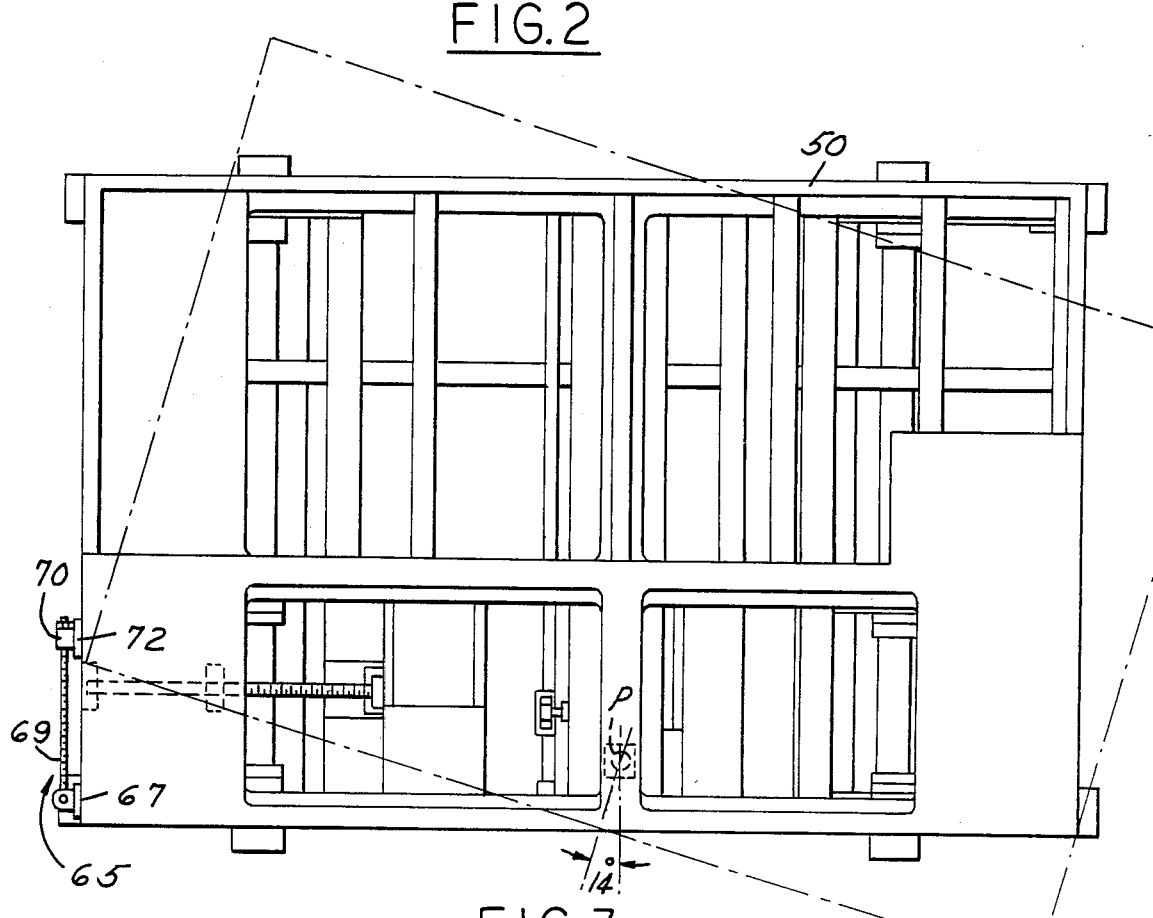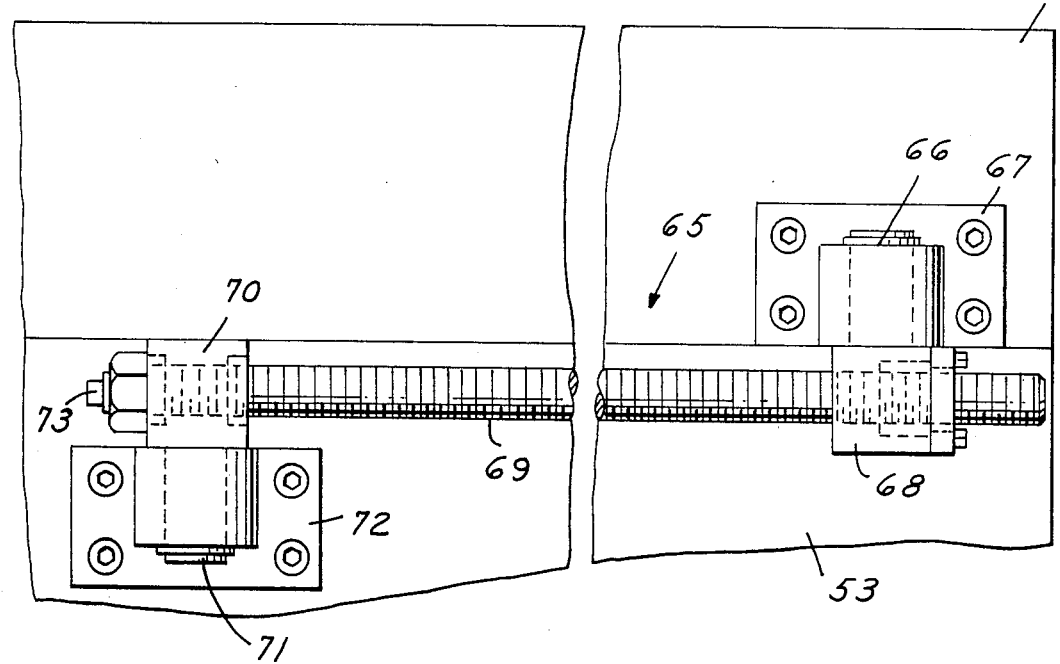

BLOW MOLDING APPARATUS

This invention relates to blow molding apparatus.

BACKGROUND AND SUMMARY OF THE INVENTION

In blow molding apparatus of the wheel type, a plurality of sets of molds are provided in circumferentially spaced relation on a wheel or plate that is rotated about a horizontal axis. As the wheel plate is rotated, the mold sections are moved toward and away from one another to enclose a tube that is extruded by an extruder between the open molds, close the molds and blow the enclosed portion of the tube into a hollow article such as a container. One of the problems with respect to such an apparatus is that the extruder must be positioned so that the extrusion head properly aligns the plastic tube or parison that is being extruded with respect to the plane of juncture and centerline of the molds. Such an adjustment is necessary when the molds are changed to a different size. Heretofore this has been achieved by moving the extruder bodily with respect to a base. In one type of mechanism, the base is movable vertically and horizontally toward and away from the molding apparatus. However, the movement of an extruder horizontally requires substantial effort and makes the adjustment difficult and costly.

As a result, it has been common to provide retractable wheels on the molding apparatus so that, when it is desired to change the relationship of the extruder head radially of the apparatus, the wheels are lowered and the apparatus is physically moved. This is obviously difficult, time consuming and costly and, in addition, necessitates stopping the operation of the machine.

Accordingly, among the objectives of the present invention are to provide an apparatus wherein the relationship of the extruder head radially with respect to the molds on the blow molding apparatus can be readily achieved quickly and efficiently, at relatively low cost and while the machine is operating.

In accordance with the invention, the extruder is mounted on a platen which is pivoted to a base plate for movement about a vertical axis such that an extruder mounted on the base plate and having an extrusion head can be adjusted radially of the wheel to align the extruded plastic material with the plane of juncture of the mold sections.

DESCRIPTION OF THE DRAWINGS

FIG. 2 is a plan view of the apparatus shown in FIG. 1A with the extruders removed.

FIG. 3 is a fragmentary part sectional end view on an enlarged scale of a portion of the apparatus shown in FIG. 2 taken from the left.

DESCRIPTION

Figure 1:
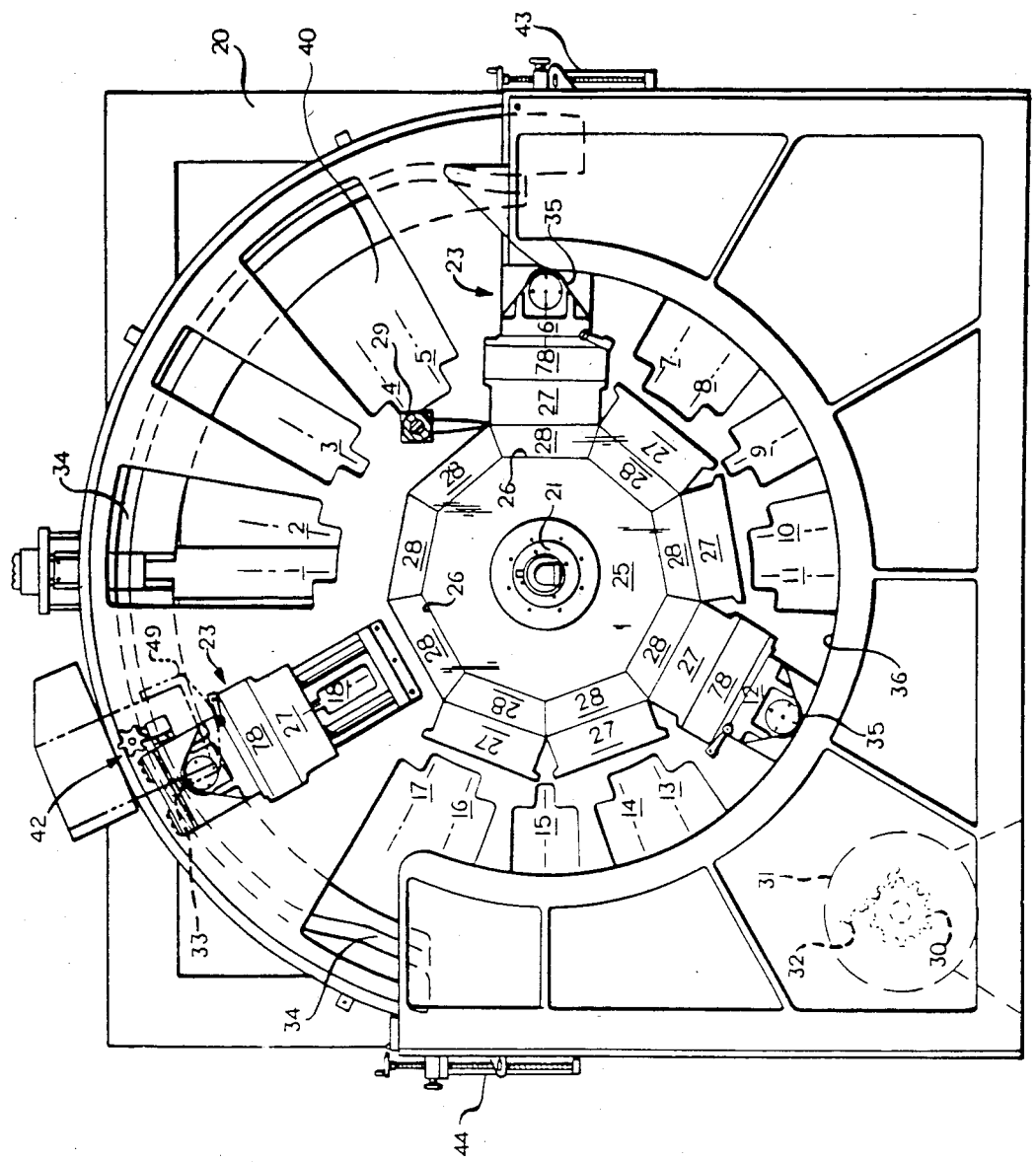
FIG. 1 is an elevational view of a blow molding apparatus, parts being broken away.

Referring to FIG. 1, the blow molding apparatus embodying the invention comprises a frame 20 in which a shaft 21 is mounted for rotation about a horizontal axis by spaced bearings in cantilever fashion. A wheel plate 22 is rotatably mounted on the shaft 21 for rotation with the shaft 21 and supports a plurality of circumferentially spaced slide assemblies 23. A hub 25 is also mounted on the shaft and has a plurality of circumferentially spaced mold supporting surfaces 26 corresponding in number to the number of slide assemblies 23.

Each slide assembly 23 comprises mold section mounting means for supporting a section or part 27 of mold and the corresponding surface 26 of the hub 25 supports the second section 28 of a mold. Each slide assembly 23 is adapted to move the mold section 27 toward and away from the other mold section 28 to close about a heated parison emanating from an extruder head 29 so that the parison can be blown to the shape of the mold cavity defined by the mold sections 27,28 as the wheel rotates. The parison is provided from the head 29 of an extruder in the two o'clock position as shown in FIG. 1.

Wheel plate 22 is rotated by a gear 30 driven by a motor 31 and meshing with a rack 32 on the periphery of the wheel plate. Each slide assembly 23 includes a cam follower 33 which engages a fixed arcuate cam 34 on the frame 20 to move mold section 27 toward and away from mold section 28. A second cam follower 35 on each slide assembly 23 engages a second fixed cam 36 on frame 20 to hold the mold sections 27,28 in closed position. Second cam 36 extends generally from the three o'clock position just beyond the twelve o'clock position as viewed in FIG. 1.

An air valve assembly 42 is provided on each slide assembly 23 and is actuated by an actuator 43 along the path of the molds that function to turn the blow air on for blowing the article and another actuator 44 is provided along the path to function to turn the air valve assembly 42 off cutting off the flow of blow air to the blowing apparatus. Each valve assembly 42 includes an on-off valve that functions to control the flow of blow air to a valve block and, in turn, through lines to a blow pin which functions to provide blow air for blowing the hollow article when the molds are closed, in a manner well known in the art.

In operation, the plastic material is continuously extruded from the head 29 of the extruder and flows downwardly between the mold sections 27,28. As the wheel plate continues to rotate, the mold sections 27,28 are brought together pinching the plastic material and air is supplied to the interior of the tubular parison to blow the article in a manner well known in the art. As the article reaches the position when the blow mold is open (12 o'clock position as viewed in FIG. 1), a fixed actuator 49 contacts an ejector on each mold section 28 to eject the articles onto a conveyor.

The invention is directed to an apparatus for moving the extruder and in turn the extruder head 29 generally radially as viewed in FIG. 1 in order that the plastic tube being extruded downwardly from the extruder head 29 will have its axis aligned with the plane of juncture of the mold sections 27,28. Such movement is necessary when the molds are changed and replaced by molds of different sizes.

Figure 1A:
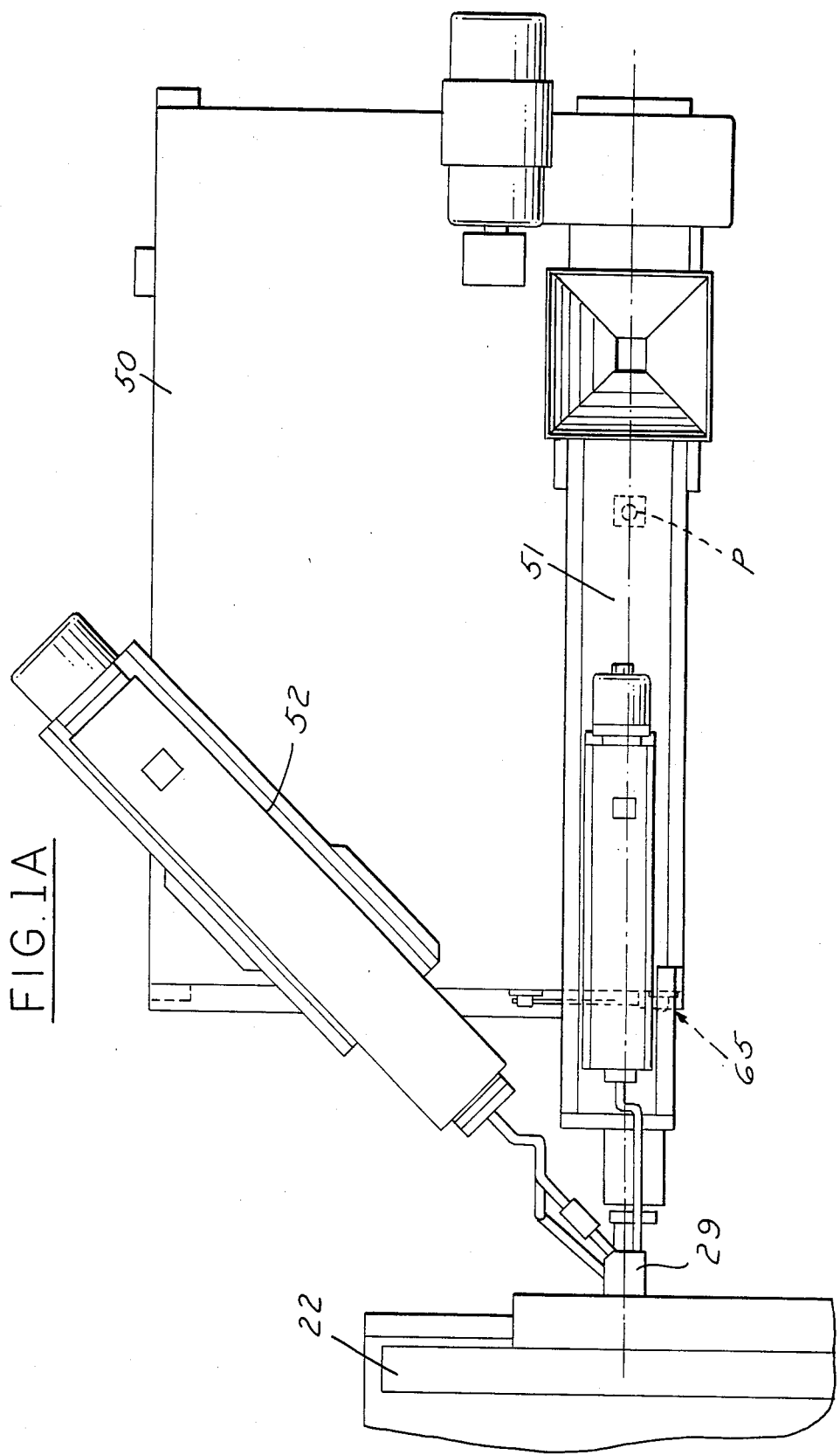
FIG. 1A is a partly diagrammatic plan view of the apparatus embodying the invention.

Referring to FIG. 1A, a platen 50 is mounted adjacent the wheel 22 and supports extruders 51,52 which supply plastic to the extruder head 29. In accordance with the invention, the platen 50 is mounted for pivotal movement about a vertical axis of a pin P, as presently described, so that the pivotal movement will provide the desired generally radial or horizontal movement of the extruder head 29.

Figure 4:
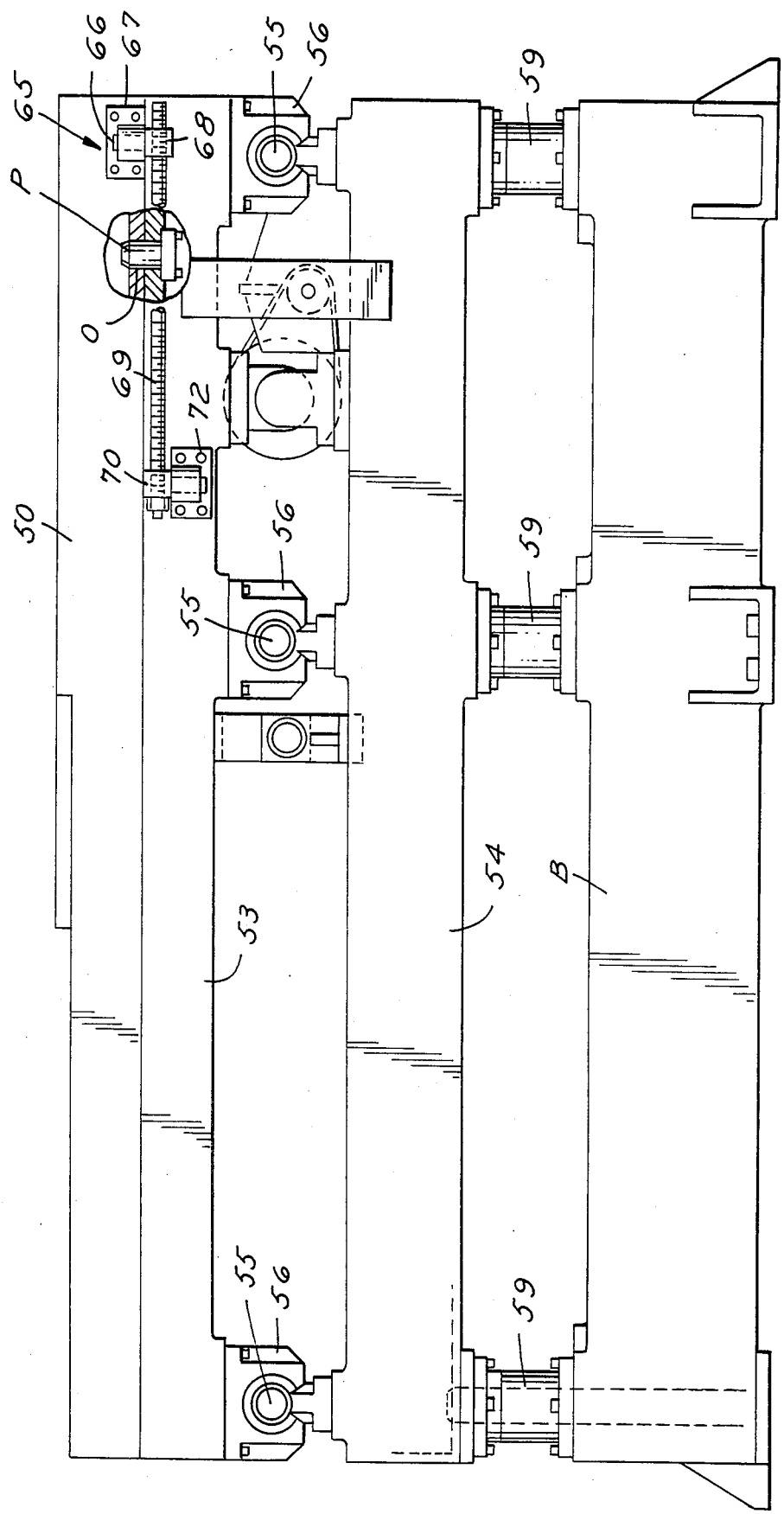
FIG. 4 is a part sectional end view of the apparatus shown in FIG. 2 taken from the left.
Figure 5A:
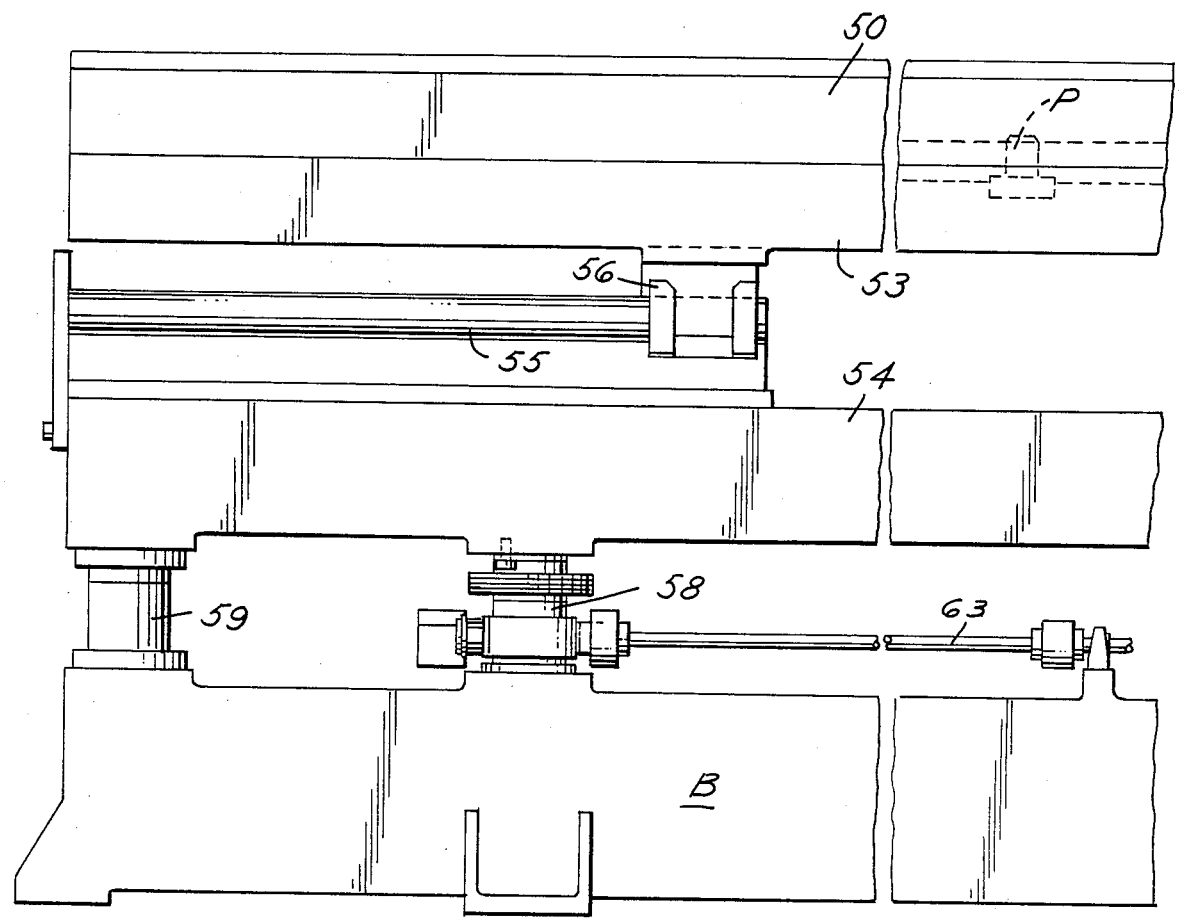
FIGS. 5A and 5B are fragmentary part sectional front elevational views of the apparatus shown in FIG. 2.
Figure 5B:
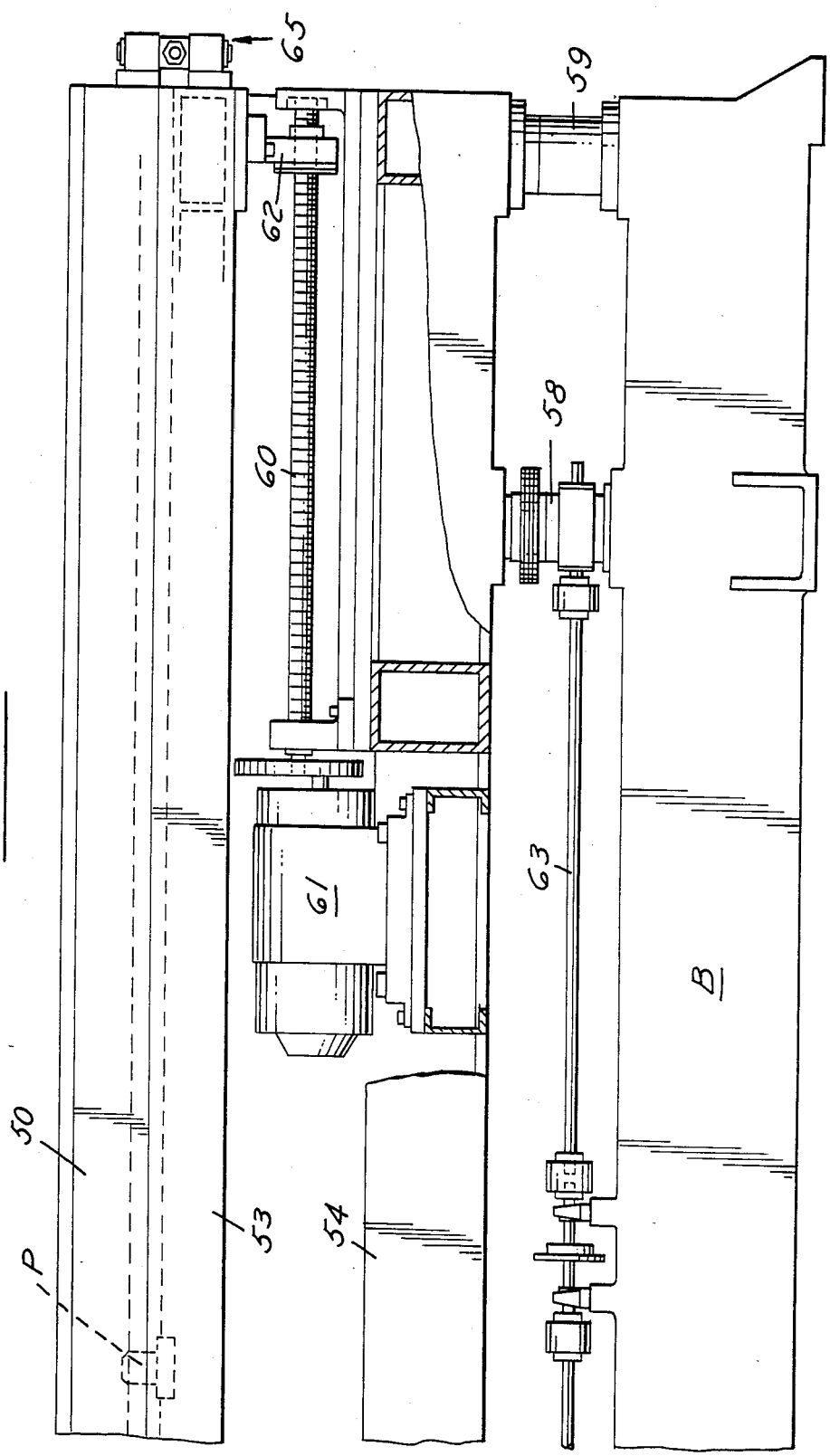

Referring to FIGS. 4, 5A and 5B, platen 50 is in the form of a plate having cut-out portions to reduce the weight and is pivoted and supported on a base plate 53 by pivot pin B that extends upwardly into an opening O in the platen. Base plate 53 is in turn mounted for longitudinal movement with respect to an intermediate base plate 54 and intermediate base plate 54 is mounted for vertical movement on a base B.

More specifically, base plate 53 is supported on horizontal rods 55 by bearings 56. Intermediate base plate 54 is adjusted vertically with respect to base B by jack shafts 58 and guided by vertical post 59.

The transverse longitudinal relative movement between base plate 53 and intermediate plate 54 is achieved by a screw 60 journalled on intermediate plate 54 and having a nut 62 thereon which is fixed to the underside of the base plate 53. Screw 60 is driven by a motor 61.

The jack shafts 58 are driven by a shaft 63 which in turn is rotated by a motor not shown. Heretofore the extruders have been mounted on the base plate 53 which was movable toward and away from the plane of the wheel and, in turn, was movable vertically by the intermediate plate 54.

In order to provide controlled pivotal movement of the platen 50 and thereby adjust the position of the extruder head 29 at any time even when the blow molding apparatus is running, an adjusting mechanism 65 is provided and comprises a vertical pin 66 journalled in a bracket 67 and supporting a nut 68 threaded on one end of a horizontal shaft 69. The other end (73) of shaft 69 is threaded in a nut 70 that is supported by a vertical pin 71 which in turn is journalled in a bracket 72 on the base plate 53. By applying a wrench to the end 73 of the threaded shaft 69, the platen 50 can be adjusted through a wide angle as shown in broken lines in FIG. 2. Since the pivot pin P is spaced at some distance from the mechanism 65 and the extruder head projects beyond the edge of the platen 50 as shown in FIG. 1A, the extruder head is moved in a substantially straight line and produces the desired adjustment in the direction of the arrows as viewed in FIG. 1.

I claim:

1. In a blow molding apparatus wherein a plurality of sets of molds are mounted on a wheel rotatable about a horizontal axis and each set of molds comprises mold sections that are movable radially inwardly toward and away from one another to define a blow molding cavity wherein the plastic material is extruded from an extruder having an extruder head downwardly between the open molds, the apparatus comprising
   a base plate,
   a platen pivoted on said base plate for movement about a first vertical axis,
   and means for pivoting said platen about said first vertical axis such that an extruder mounted on said platen and having an extruder head can be adjusted radially of the wheel to align the extruded plastic material with the plane of juncture of the mold sections.

2. The apparatus set forth in claim 1 wherein said means comprises a threaded shaft interconnecting said platen and said base plate.

3. The apparatus set forth in claim 2 wherein said means further comprises a first nut rotatably supported on said platen having one end of said shaft threaded therethrough, a second nut rotatably supported on said base plate having the other side of said shaft threaded therethrough, whereby rotation of said shaft at the other end thereof pivots the threaded shaft about a second vertical axis such that the one end of said shaft pivots the platen with respect to the base plate about said first vertical axis.

4. The apparatus set forth in claim 2 including an intermediate base plate and means for mounting said base plate on said intermediate base plate for horizontal movement in a linear path relative to said intermediate base plate.

5. The apparatus set forth in claim 4 including a base and means for mounting said intermediate base plate for vertical movement relative to said base.

6. The apparatus set forth in claim 1 including a plurality of extruders mounted on said platen and movable with said platen.

* * * * *